April 30, 1929.  G. PAGANO  1,710,892

AUTOMOBILE SAFETY FENDER

Filed Dec. 15, 1927

INVENTOR
Gaetano Pagano,
BY
Ray Belmont Whitman
ATTORNEY

Patented Apr. 30, 1929.

1,710,892

UNITED STATES PATENT OFFICE.

GAETANO PAGANO, OF BROOKLYN, NEW YORK.

AUTOMOBILE SAFETY FENDER.

Application filed December 15, 1927. Serial No. 240,231.

This device refers to safety means, and more especially to a safety fender for automobiles or other vehicles.

An object of the invention is to provide a device which can be mounted on the front of an automobile, for instance, and is adapted to be instantly let down into operative position by the driver, to prevent persons getting under the wheels.

Another object is to provide a device which will not injure the persons hit and which will either push them to one side of the vehicle out of the way of the wheels, or else keep them in front until the vehicle can be stopped.

These and other objects of the invention are described herebelow, and illustrated in the accompanying drawing, in which—

Figure 1:
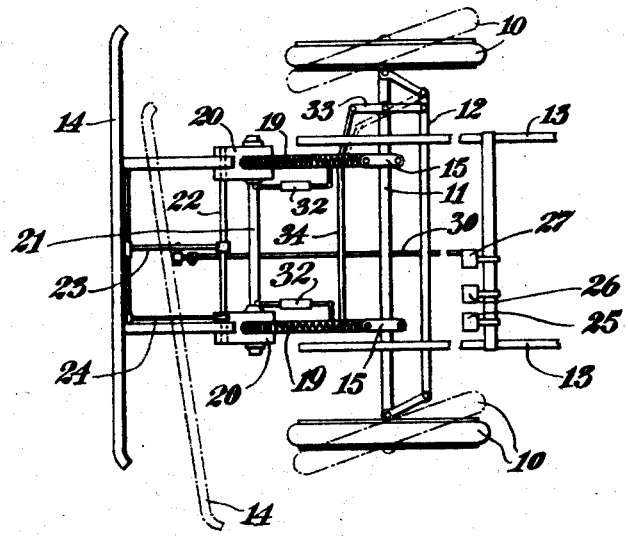
Figure 2:
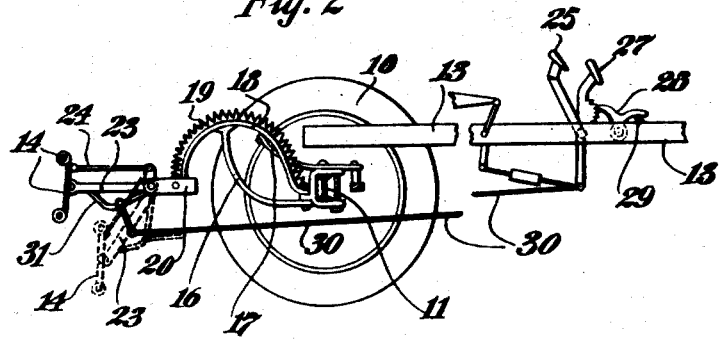

Fig. 1 is a top-plan view of the essential operating details of the complete device, somewhat in diagrammatic form; Fig. 2, a side elevational view of the essential parts of the invention, similarly illustrated; and Fig. 3, an incomplete front view of the safety—or pushing—member.

Like numerals refer to like parts throughout the several views.

The invention is illustrated as attached to the front of an ordinary automobile, which has a pair of front wheels, 10, pivoted on bearings on a cross frame or axle 11, and connected together in the usual manner, by a radius rod 12. The main chassis frames of the car, on which the body is mounted, are shown at 13.

Figure 3:
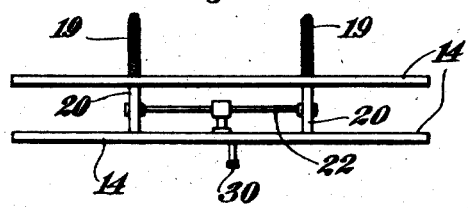

The invention consists of pushing members 14, Fig. 3, adjustably fixed in front of the front wheels of the auto, as shown, and consisting of two or more parallel bars, extending across the front of the car and somewhat greater in length than its width. These cross members are preferably covered with rubber or other resilient material to minimize the destructive action of the blow, when the pedestrian is hit. This feature is suggested in Fig. 2.

The braces 16, Fig. 2, support, at a central point, rigid forwardly-curved frames 18, along and over which are mounted spiral springs 19 attached to links 20, connected by an axle 21, Fig. 1, this axle 21 projecting across the front of the car substantially in front of the front wheels, so as not to interfere with their turning.

At the forward end of links 20, is revolvably mounted a cross member 22, and keyed to it and extending forwardly thereof, is an operating bar 23, connected to a central point of the frame of the pushing members 14.

Near the top of the pushing members 14, and arranged on one side, is a second connecting bar 24, Fig. 2, pivoted to the frame of members 14, and adapted to pivot it so that as it is pushed downwardly into operative position, its two pushing members will always be in a substantially vertical plane.

Extending through the automobile floor near the driver's seat, and to the right of the clutch pedal 25, Fig. 1, and foot brake 26, is a third pedal 27, arranged with a ratchet member 28, Fig. 2, and adapted to be pressed down or forwardly, and held in that position by the member 28 engaging with teeth on the pedal 27, through the action, for instance, of a spring 29, positioned as shown, and permitting the driver to disengage the parts by pressing on the back portion of member 28, when pedal 27 returns backwardly to its normal position through the action of spring 29. Pedal 27 is connected with the foot brake 25, to operate it also. An operating rod 30, Fig. 2, connects, through suitable linkage, the pedal 27 with an actuating lever member 31, adapted to push the pushing members 14 downwardly while retaining it in a vertical plane, when the pedal 27 is depressed; but when the ratchet member 28 is released, as explained, spiral springs 19 act to return the pushing members 14 with their attendant parts, upwardly away from proximity to the road, thus permitting the normal clearance of the car to be maintained until the safety device is again required in an emergency.

Turn buckles 32, Fig. 1, arranged as shown, are adapted to be adjusted to position the various connected parts in proper operative relation and take up slack due to the loss of resiliency of the spring, or improper positioning from other causes.

Connected to the radius rod 12 is an operating link 33, Fig. 1, which, through a cross member 34, laterally moves the full structure which comprises this invention. Thus the movement of the wheels to one side or the other carries with it the pushing members 14, so that the latter will always be in front of the wheels. This is shown clearly by the dot and dash line position of the pushing members and wheels.

In the operation of the device, it is only necessary for the driver to depress pedal 27 quickly, in the event he wishes to properly position the safety fender low down in front of the front wheels to prevent anyone from getting underneath. This movement of the pedal 27 will of course cause a backward movement on the connecting rod 30, pulling on member 31 to force the pushing members 14 downwardly, and since these are connected up "pantograph" fashion, that is, with parallel links, a movement downwardly will nevertheless maintain them in a vertical plane. This movement is against the tension of spiral springs 19, which tend to retain the parts in their uppermost position. As soon as the pedal 27 is released, as by releasing the part 28, springs 19 will return the pushing members 14 and their attendant parts to their normal raised position away from the proximity of the road.

It is to be understood that the present disclosure is for the purpose of illustration only, and that the invention is not limited thereto. To those skilled in the art, many modifications of the invention will be readily apparent, and it will also be obvious to such skilled persons that parts of the device may be used without other parts thereof, and steps in the method, without other steps, many such combinations readily suggesting themselves. Therefore, it should be and is to be distinctly understood that for a definition of the limitations of the invention, reference must be had to the appended claims.

Having now described the invention, what is claimed as new, and for which Letters Patent of the United States is desired, is:

1. In combination, a safety guard member, a pivoted member mounting said member, a member connecting the pivoted member with a pivoted operating means, spring means adapted to retain the safety member in one position and permit its movement to another position on the operation of the pivoted operating means, in combination with the front wheels of a vehicle, including means for maintaining the safety guard always in front of the front wheels as the latter are turned.

2. In combination, in a rod vehicle, a pair of pivoted front wheels, safety fender means positioned in front thereof, and adapted to be moved with the pivoted movement of the wheels to a position always in front of them, the safety fender means being adapted to be moved so as to retain its whole surface always in a substantially vertical plane.

3. In combination, a safety guard member, a pivoted member mounting said member, a member connecting the pivoted member with a pivoted operating means, spring means adapted to retain the safety member in one position and permit its movement to another position on the operation of the pivoted operating means, a pair of vehicle front wheels, means for maintaining the safety guard always in front of the front wheels as the latter are turned, the safety guard member having laterally-spaced surfaces, and means for maintaining said surfaces always in a substantially vertical plane.

4. In combination in a road vehicle, a pair of pivoted front wheels, safety fender means positioned in front thereof and adapted to be moved with the pivoted movement of the wheels to a position always in front of them, spring means retaining said safety fender means in an upper position, means adapted to be operated from the driver's seat for forcing the safety guard into a downward position against the tension of said spring means, the safety guard member having laterally-spaced surfaces, and means for maintaining said surfaces always in a substantially vertical plane.

Signed at New York, in the county of New York and State of New York, this 14th day of December, A. D. 1927.

GAETANO PAGANO.